March 18, 1952 C. R. CROSON 2,589,541
PIPE SHAPING APPARATUS
Original Filed Feb. 14, 1946 7 Sheets-Sheet 1

INVENTOR
Clyde R. Croson
BY Mauro & Lewis
ATTORNEYS

March 18, 1952     C. R. CROSON     2,589,541
PIPE SHAPING APPARATUS

Original Filed Feb. 14, 1946     7 Sheets-Sheet 2

INVENTOR
Clyde R. Croson
BY Mauro + Lewis
ATTORNEYS

March 18, 1952 C. R. CROSON 2,589,541
PIPE SHAPING APPARATUS
Original Filed Feb. 14, 1946 7 Sheets-Sheet 3

INVENTOR
Clyde R. Croson
BY
ATTORNEYS

March 18, 1952     C. R. CROSON     2,589,541
PIPE SHAPING APPARATUS
Original Filed Feb. 14, 1946     7 Sheets-Sheet 4

INVENTOR
Clyde R. Croson
BY
Mauro & Lewis
ATTORNEYS

March 18, 1952 C. R. CROSON 2,589,541
PIPE SHAPING APPARATUS
Original Filed Feb. 14, 1946 7 Sheets-Sheet 5

INVENTOR
Clyde R. Croson
BY Mauro & Lewis
ATTORNEYS

March 18, 1952  C. R. CROSON  2,589,541
PIPE SHAPING APPARATUS
Original Filed Feb. 14, 1946  7 Sheets-Sheet 6

INVENTOR
Clyde R. Croson
BY Mauro & Lewis
ATTORNEYS

Patented Mar. 18, 1952

2,589,541

UNITED STATES PATENT OFFICE 2,589,541

PIPE SHAPING APPARATUS

Clyde R. Croson, Wheeling, W. Va.

Original application February 14, 1946, Serial No. 647,503, now Patent No. 2,563,214, dated August 7, 1951. Divided and this application April 25, 1950, Serial No. 157,979

6 Claims. (Cl. 153—54)

This invention relates to a novel apparatus for shaping and forming pipe or other metal tubes from elongated flat blanks of skelp preparatory to the stage of welding the open longitudinal seam thus formed into a closed pipe or tube. This application is a division of my copending application Serial No. 647,503, filed February 14, 1946, Patent No. 2,563,214 granted August 7, 1951, in which the entire apparatus is described and claims have been addressed to those stages of the apparatus primarily concerned with the welding of the pipe seam.

The general object of the present invention is to form tubular pipe from preheated stock into shape suitable for immediate welding, the pipe having been shaped by successive steps and means designed to provide such an article free of stresses, strains or deformations, and of uniform wall thickness. According to my invention the pipe thus formed preparatory to closure by welding will have been uniformly reduced in wall thickness during the stages of rolling and bending it from flat stock to tubular stock, and the grain of the steel will not have been injured. The reduction in wall thickness is held to the minimum.

My invention is especially useful in the formation of tubular pipe from heavy gauge skelp, the working of which in any continuous process is very difficult.

Other objects and purposes will appear from this specification and from an examination of the accompanying drawings, in which.

The various parts of my invention are mounted upon a foundation 31. Standing upon said foundation at the forward end thereof is a housing 32 in which is horizontally journaled a pair of rolls 33 and 34 of ordinary cylindrical construction, designed to be geared to a driving mechanism (not shown). Likewise mounted upon the housing 32 forward of the bite of the rolls 33 and 34, by means of a pair of brackets 35, is a table 36 designed to receive the approaching skelp 37 (which has been heated to forging temperature in a furnace which is not shown) and direct it into the bite of the rolls. Mounted upon the table 36 near each side is a guide member 38 designed to center the skelp as it approaches the rolls 33 and 34. Said rolls are intended not only to assist in driving the skelp through the machine, but also to apply sufficient pressure to assure its being of substantially uniform thickness as it passes said rolls. The pressure applied by rolls 33—34 is adjusted by screws 83. The function of rolls 33—34 is therefore to assure starting with a perfect plate.

Figure 1:
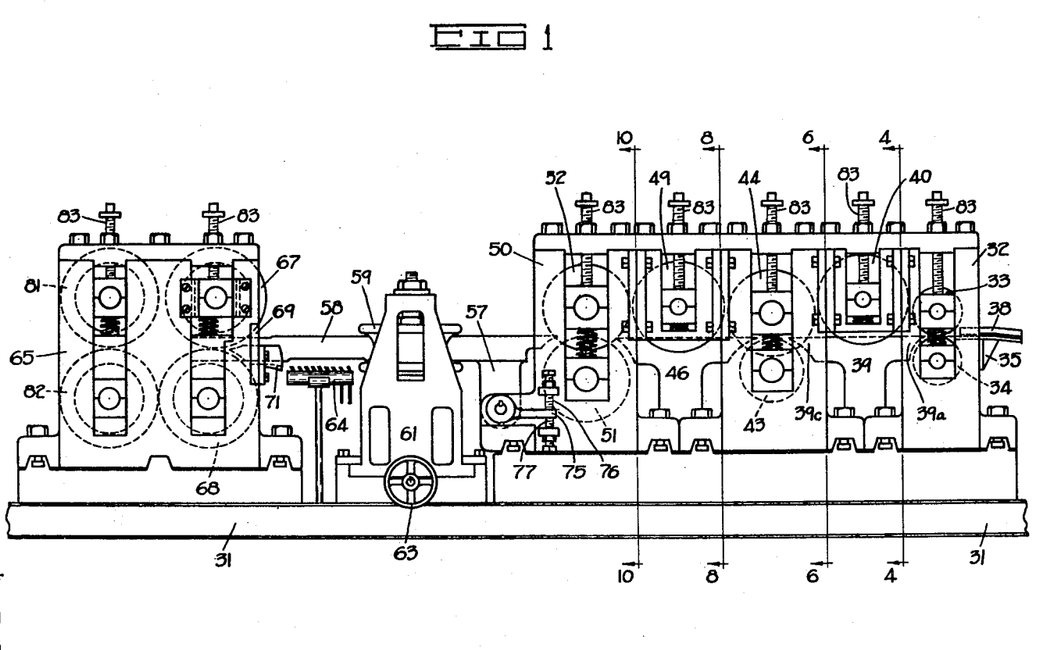
Figure 1 represents, in diagram, a side elevation of a mill or machine embodying my invention.
Figure 2:
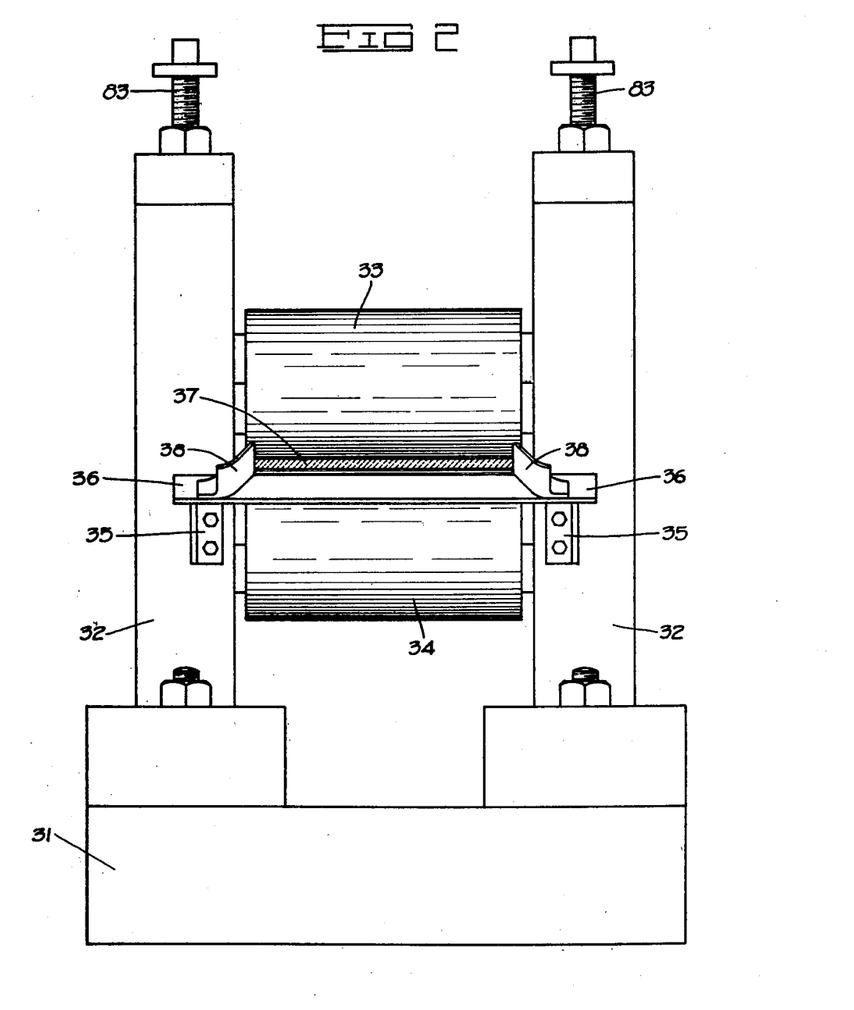
Figure 2 is an end elevation of the first pair of rolls, showing in cross-section a slab of skelp gripped between the rolls.
Figure 3:
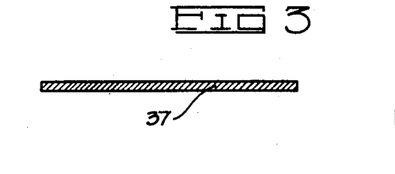
Figure 3 shows the form of the skelp as it passes the rolls illustrated in Figure 2.
Figure 4:
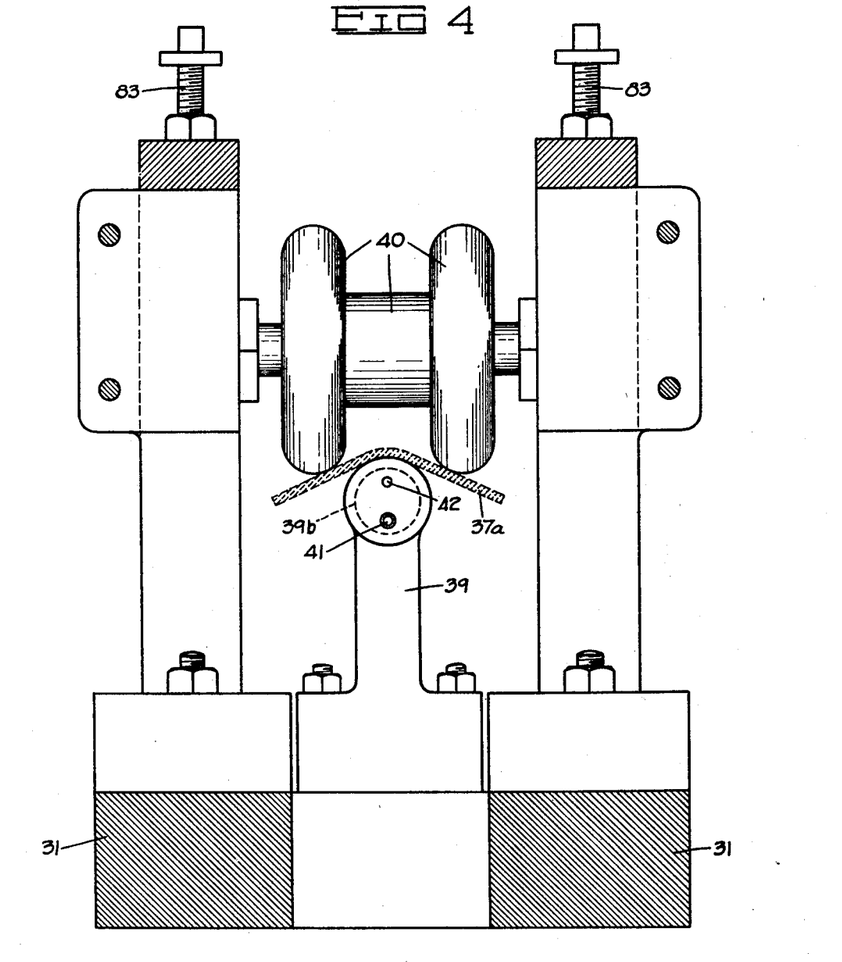
Figure 4 is a cross-section of the mill taken substantially on the line 4—4 of Figure 1, and showing in end elevation the first forming or break-down roll and its opposed anvil and also showing, in dotted cross-section, the skelp in position.
Figure 5:
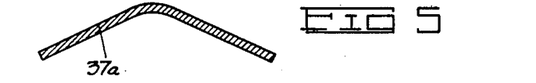
Figure 5 shows the form of the skelp as it passes the roll illustrated in Figure 4.
Figure 10:
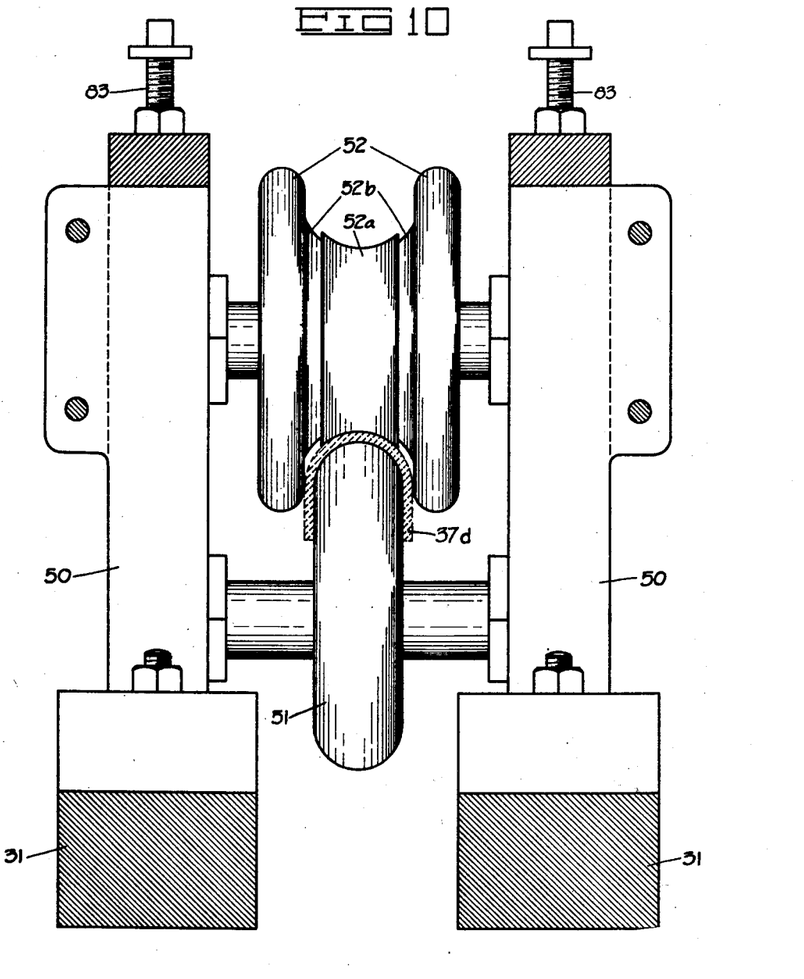
Figure 10 is a cross-section of the mill taken substantially on the line 10—10 of Figure 1 and showing in end elevation, the second pair of forming rolls and also showing, in dotted cross-section, the skelp in position between said rolls.

Mounted upon the foundation 31, to the rear of the housing 32, is an anvil 39, the forward horn of which approaches the surface of the roll 34 near the upper part thereof (as shown in Figure 1 at 39A), so as to receive and support the hot skelp 37 as it emerges from the rolls 33 and 34. The skelp, being very hot at that point in its progress through the machine and, indeed, until it has passed the rolls illustrated in Figure 10, it would tend to sag if not supported. Journaled above the anvil 39 is a break-down or dumb-bell roll 40, so positioned with reference to the anvil 39 that, as the skelp 37A passes between it and the anvil 39, there is imparted to the skelp the inverted-channel form illustrated in Figure 5. The upper portion of the anvil 39 upon which the hot skelp rides is preferably made hollow (as shown in dotted lines at 39B in Figure 4) so that it can be cooled by water supplied to an opening 41 in one end of the anvil. The water escapes from the interior of the anvil through a vent 42 placed near the top of the hollow portion of the anvil. The rear horn 39C of the anvil 39 supports the skelp against sagging until it reaches the roll 43.

It will be noted that roll 40 and anvil 39 are designed and operate to impart an initial bend at the central longitudinal section of skelp 37A without, however, rolling or compressing said skelp at this particular stage.

Figure 6:
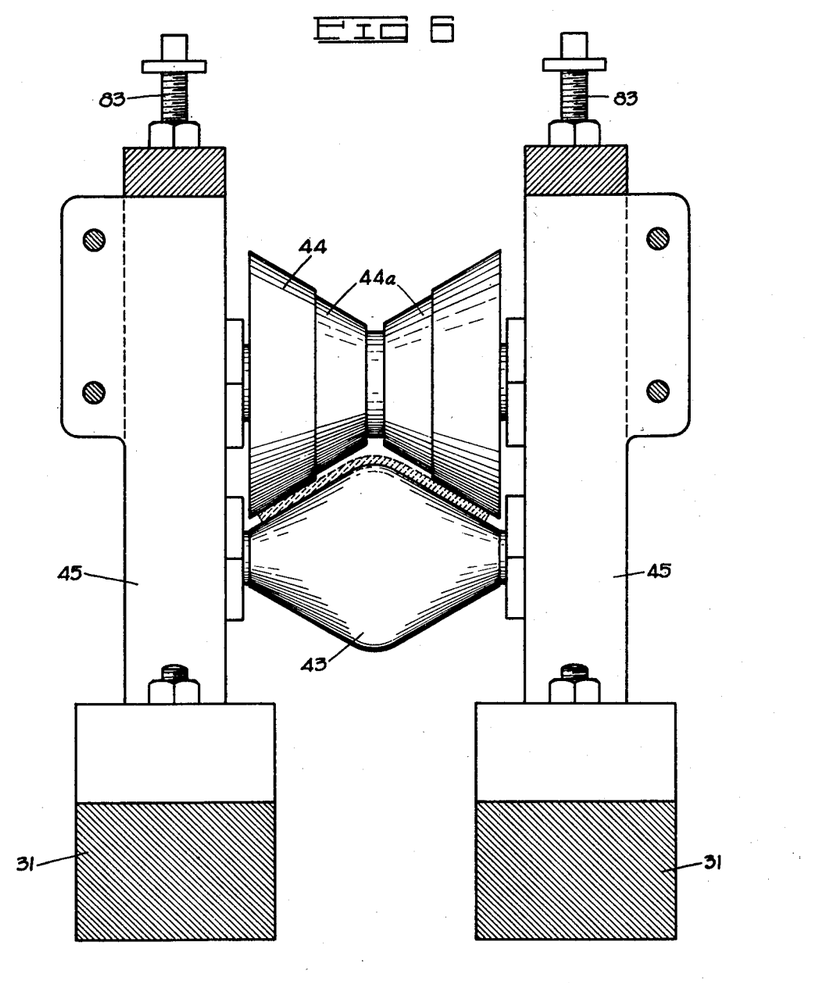
Figure 6 is a cross-section of the mill taken substantially on the line 6—6 of Figure 1, and showing in end elevation the first pair of forming rolls and also showing, in dotted cross-section, the skelp in position.
Figure 7:
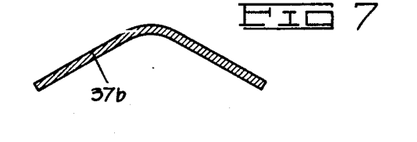
Figure 7 shows the form of the skelp as it passes the rolls illustrated in Figure 6.
Figure 8:
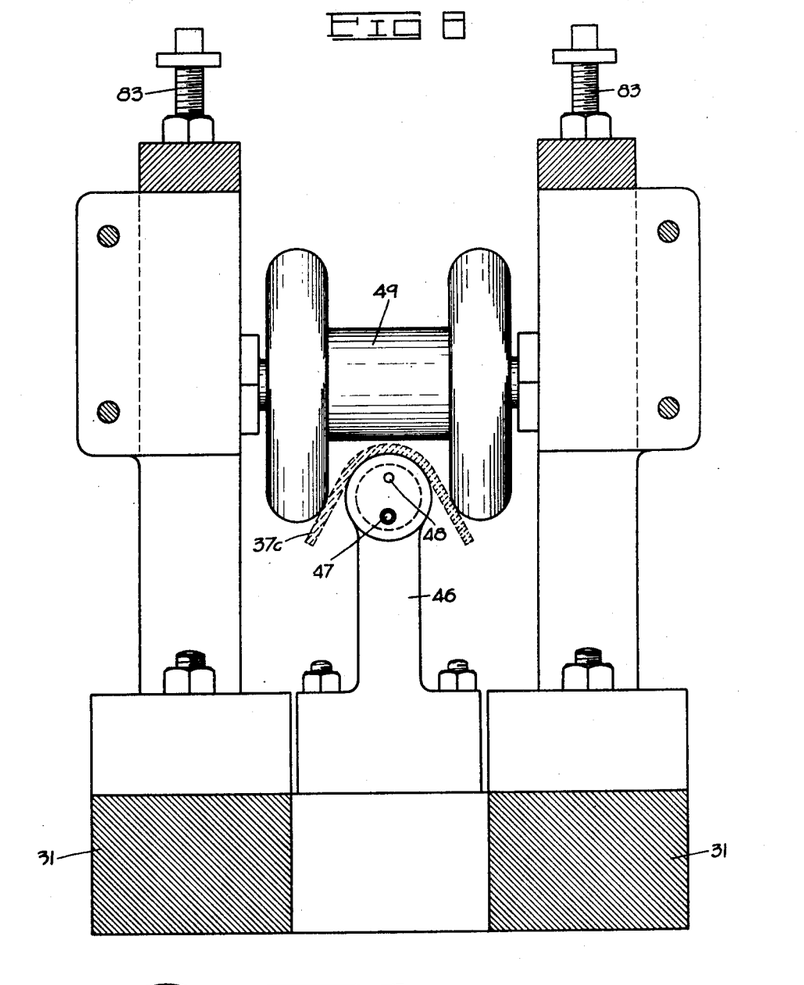
Figure 8 is a cross-section of the mill taken substantially on the line 8—8 of Figure 1, showing in end elevation the second dumb-bell roll with its opposing anvil and also showing, in dotted cross-section, the skelp in position.

As seen in Figures 1 and 6, roll 43 and its companion roll 44 are journaled in a housing 45, likewise mounted upon the foundation 31 to the rear of the anvil 39. Rolls 43 and 44 are formed in such a manner as to increase somewhat the depth of the channel imparted to the skelp by the dumb-bell roll 40. Its opposing roll 44 is recessed through a portion of its surface, as at 44A, so that the skelp 37B, in passing between said rolls, is gripped and compressed only by the unrecessed portion of said roll. The rolls 43 and 44 are intended to be driven by power, so as to assist in forcing the skelp through the machine in addition to imparting some additional flexion to it.

Figure 9:
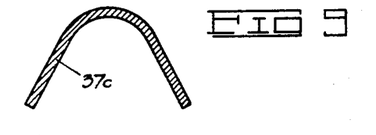
Figure 9 is a cross-section of the skelp showing the form it assumes upon passing under the roll illustrated in Figure 8.

A second anvil 46 is mounted upon the foundation 31 to the rear of the rolls 43 and 44. In shape said anvil resembles the anvil 39, and it is similarly cooled by water supplied through the opening 47 and discharged through the over-flow vent 48. Journaled above the anvil 46 is a second dumb-bell roll 49 which imparts some additional flexion to the skelp 37C as it slides along the upper surface of the anvil 46, so that, upon passing the roll 49, the skelp has been bent into substantially the form shown in Figure 9. Roll 49, like roll 40, applies no substantial compression which would affect the wall thickness of skelp 37C.

To the rear of the anvil 46 there is mounted upon the foundation 31 a housing 50 in which is journaled a pair of rolls 51 and 52. Upon leaving the rear horn of the anvil 46, the hot skelp is gripped by the last-mentioned rolls by which it is bent into substantially the form illustrated in Figure 11, that is, inverted U-shape. In addition to imparting to the skelp the additional flexion necessary to give it the form just mentioned, the rolls 51 and 52 are power-driven so as to assist in forcing the skelp through the machine or mill, and for the latter purpose the skelp 37D is gripped between that portion of the surface of the roll 52, indicated by the numeral 52A, and the corresponding surface of the roll 51, the roll 52 being recessed at 52B so as to leave a portion of the skelp ungripped as it passes between said rolls.

Manifestly, the skelp will be compressed or thinned throughout that portion thereof gripped by the opposing rolls 51 and 52 between which it passes and, therefore, in order that a substantially uniform thickness of the skelp may be maintained, the portion of the surface of the skelp gripped between the unrecessed surface of the roll 52 and its opposed roll 51 is intended to correspond with the portion of the surface of the skelp that was ungripped between rolls 43 and 44.

In other words, the width of the recessed portion of the roll 44 should correspond substantially with or exceed slightly the unrecessed portion of the roll 52.

Figure 12:
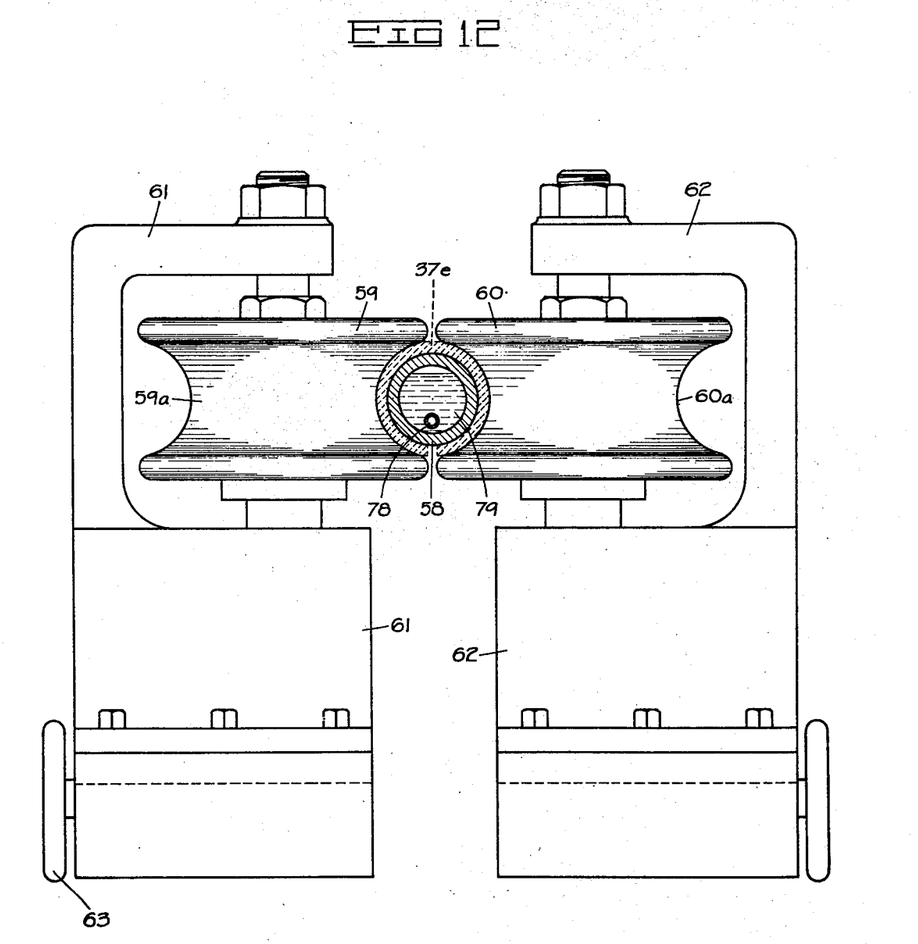
Figure 12 is an end elevation of the third pair of forming rolls illustrating in cross-section a portion of the mandrel shown in Figure 1 and also, in dotted cross-section, the skelp in position between said rolls.
Figure 13:
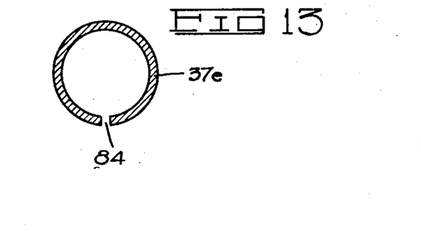
Figure 13 is a cross-section of the skelp as formed by the rolls of Figure 12.

Adjustably mounted upon the foundation 31 is a mandrel 58 (Figures 1 and 12) illustrated in detail in my copending application Serial No. 647,503. Mandrel 58 is mounted on an arm 57 (Figure 1), the arm being pivotally mounted and tiltably adjustable by operation of lever 75 confined between set screws 76 and 77. As shown in Figure 12, mandrel 58 is cooled by water 79 entering through supply pipe 78. For the purpose of the present invention, the function of mandrel 58 is to support with a loose fit, the skelp 37, during of the operation of rolls 59 and 60. Said mandrel receives, at its forward end, the inverted U-shaped skelp, as it emerges from the rolls 50 and 51, and guides it into the bite of the vertically journaled horizontal rolls 59 and 60 which are illustrated in detail in Figure 12. Said rolls are journaled, respectively, in housings 61 and 62, appropriately mounted upon the foundation 31 and adjustable toward and away from each other, as by means of a screw 63, in a manner well understood in the art. The peripheral surfaces of the rolls 59 and 60 are recessed into substantially semicircular channels 59A and 60A, so that the hot skelp 37E, when received therebetween, will thereby be bent around the mandrel 58 into substantially tubular form, as shown in Figure 13. At this point in the progress of the skelp through this machine, it is preferred that there remain a slight gap between the opposite sides or edges of the skelp, as is most clearly shown at 84 in Figure 13.

Figure 11:
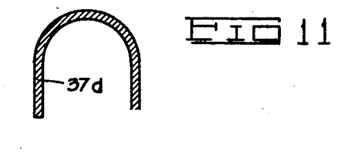
Figure 11 shows the form of the skelp as it passes the rolls illustrated in Figure 10.

It should be emphasized that the rolls 59 and 60 are not adjusted so as to apply compression to the skelp 37E, but merely to bring the lower edges of the open skelp from the shape shown in Figure 11 to that of Figure 13.

After leaving rolls 59 and 60 the skelp is shaped in the form of a perfect tubular body of uniform diameter and free of distortion. The open gap or seam 84 is then ready for welding by the remainder of the machine which is more particularly described and claimed in my application Serial No. 647,503. For the purposes of understanding Figure 1, however, it will be noted that after leaving rolls 59 and 60 the skelp passes further along mandrel 58 and over a source of heat or torch 64 where it is taken by a pair of laterally adjustable bell guides and fed into welding rolls 67 and 68. Guide 71, mounted on bracket 69, is shown in Figure 1. The skelp, now formed and welded, then passes to delivery rolls 81 and 82 which with rolls 67 and 68 are journaled in housing 65.

Manifestly, some or all of the rolls in this machine may be power-driven, but since the methods and means of applying power to rolls in machines of this kind are well known in the art, and in order to avoid confusing detail in the drawings and unnecessary prolixity in the specifications, the driving means are omitted.

Screws 83 are provided for each roll in order to regulate the pressure to be exerted by the various rolls upon the material being worked, in a manner also well known in the art, and said screws 83 are merely illustrative of devices well known.

Manifestly, pipe or tubing of any desired lengths and likewise of very heavy gauge and large diameter can be formed on this machine.

From the foregoing description it will be seen that to the extent that compressional rolling of the skelp is necessary, the apparatus of my invention is designed to apply such compression uniformly to all areas of the skelp. Also it will be seen that among the progressive stages of shaping the flat blank of skelp into tubular form, there are bending stages where no compressional force is applied to the pipe, these stages being interspersed with other rolling stages, the sum total of which is to apply a uniform compression. Special attention is called to that part of my invention which provides for a stage of rolling areas of the skelp approximately one-half of its total area, and a later stage which rolls the remainder of the skelp not rolled by the first-mentioned stage.

The precise design of rolls illustrated and described in Figures 2-12 is preferred, but is not essential to accomplish the broad objects of the invention as will be understood from the claims which follow.

What is claimed is:

1. In a machine for forming tubular pipe stock from flat elongated sections of preheated skelp, means for feeding said skelp through a series of shaping means, a first stage of shaping means consisting of an anvil supporting said skelp at approximately its longitudinal mid-section and breakdown rolls operating adjacent said anvil in a position adjusted to impart an initial inverted channel shape to said skelp along said mid-section, a second stage of shaping means consisting of a pair of complementary rolls shaped to apply a more acute angle in the inverted channel shape of said skelp, a third stage of shaping means consisting of an anvil supporting said skelp and breakdown rolls operating adjacent said anvil in a position adjusted to impart an arcuate shape along said longitudinal mid-section corresponding to the arcuate shape of the finished pipe, a fourth stage of shaping means consisting of complementary rolls shaped to form the skelp in the shape of an inverted U, a fifth stage of shaping means consisting of a supporting mandrel and a pair of rolls having semicircular surfaces shaped to form the skelp into substantially tubular form around the mandrel with an open seam composed of the opposed edges of said skelp.

2. In a machine for forming tubular pipe stock from flat elongated sections of preheated skelp, means for feeding said skelp through a series of shaping means, a first stage of shaping means consisting of an anvil supporting said skelp at approximately its longitudinal mid-section and breakdown rolls operating adjacent said anvil in a position adjusted to impart an initial inverted channel shape to said skelp along said mid-section, a second stage of shaping means consisting of a pair of complementary rolls shaped to apply a more acute angle in the inverted channel shape of said skelp, one of said rolls having a recess in its periphery out of contact with said skelp leaving the skelp to be gripped by the un-recessed portion thereof, a third stage of shaping means consisting of an anvil supporting said skelp and breakdown rolls operating adjacent said anvil in a position adjusted to impart an arcuate shape along said longitudinal mid-section corresponding to the arcuate shape of the finished pipe, a fourth stage of shaping means consisting of complementary rolls shaped to form the skelp in the shape of an inverted U, one of said complementary rolls having recessed portions in its periphery out of contact with said skelp leaving the skelp to be gripped substantially over a surface left ungripped during the second stage of shaping, and a fifth stage of shaping means consisting of a supporting mandrel and a pair of rolls having semicircular surfaces adapted to form the skelp into substantially tubular form around the mandrel with an open seam composed of the opposed edges of said skelp.

3. In a machine for producing tubular pipe stock from flat elongated sections of preheated skelp, the said stock to be formed in tubular shape with open seam preparatory to welding, including, in combination, means for supporting and advancing the skelp, compressional shaping means comprising at least one pair of compression rolls arranged on opposed sides of the skelp, said rolls being designed to increase the amount of bend in said skelp and being cooperatively shaped to compress a selected portion of the skelp area, for each such pair of said compression rolls there being provided another pair of bending and compression rolls likewise arranged on opposed sides of the skelp, said other pair of rolls also being cooperatively shaped to compress substantially the remaining portion of said skelp, and other non-compressional shaping means designed to bend the skelp progressively into said tubular condition without compressing any substantial area thereof.

4. In a machine for producing tubular pipe stock from flat elongated sections of preheated skelp, the said stock to be formed in tubular shape with open seam preparatory to welding, including, in combination, means for supporting and advancing the skelp, compressional shaping means comprising at least one pair of compression rolls arranged on opposed sides of the skelp, said rolls being designed to increase the amount of bend in said skelp and to compress a selected portion of the skelp area, one of said pair of compression rolls being recessed peripherally to avoid contact with the non-selected portion of said skelp area, for each such pair of said compression rolls there being provided another pair of bending and compression rolls likewise arranged on opposed sides of the skelp, said other pair of rolls being cooperatively shaped to compress substantially the remaining portion of said skelp, and other non-compressional shaping means designed to bend the skelp progressively into said tubular condition without compressing any substantial area thereof.

5. In a machine for producing tubular pipe stock from flat elongated sections of preheated skelp, the said stock to be formed in tubular shape with open seam preparatory to welding, including, in combination, means for supporting and advancing the skelp, compressional shaping means comprising at least one pair of compression rolls arranged on opposed sides of the skelp, said rolls being designed to increase the amount of bend in said skelp and to compress a selected portion of the skelp area, one of said pair of compression rolls being recessed peripherally to avoid contact with the non-selected portion of said skelp area, for each such pair of said compression rolls there being provided another pair of bending and compression rolls likewise arranged on opposed sides of the skelp, said other pair of rolls being designed to compress substantially the remaining portion of said skelp, one of said last-mentioned pair of rolls being recessed peripherally to avoid contact with the skelp area previously compressed by said first-mentioned set of compression rolls, and other non-compressional shaping means designed to bend the skelp progressively into said tubular condition without compressing any substantial area thereof.

6. In a machine for producing tubular pipe stock from flat elongated sections of preheated skelp, the said stock to be formed in tubular shape with open seam preparatory to welding, including, in combination, means for supporting and advancing the skelp, compressional shaping means comprising at least one pair of compression rolls arranged on opposed sides of the skelp, one of said rolls having a central peripheral recess out of contact with said skelp along the central longitudinal area of said skelp, causing said skelp to be compressed only by the unrecessed portions of said recessed roll adjacent the longitudinal edges of said skelp, for each such pair of said compression rolls there being provided another pair of bending and compression rolls likewise arranged on opposed sides of the skelp, said other pair of rolls being cooperatively shaped to compress said skelp substantially only over the central longitudinal area of said skelp which was left uncompressed by said first-mentioned set of compression rolls, and other non-compressional shaping means designed to bend the skelp progressively into said tubular condition without compressing any substantial area thereof.

CLYDE R. CROSON.

REFERENCES CITED

The following references are of record in the file of this patent:

UNITED STATES PATENTS

| Number | Name | Date |
|---|---|---|
| 922,536 | Smith | May 25, 1909 |
| 1,192,410 | Frick | July 25, 1916 |
| 1,800,023 | Kozicz | Apr. 7, 1931 |
| 1,960,523 | Anderson | May 29, 1934 |
| 1,989,059 | Kurtze | Jan. 22, 1935 |

FOREIGN PATENTS

| Number | Country | Date |
|---|---|---|
| 444,469 | Great Britain | Mar. 20, 1936 |